United States Patent
Zoch et al.

(10) Patent No.: US 8,321,844 B2
(45) Date of Patent: Nov. 27, 2012

(54) PROVIDING REGISTRATION OF A COMMUNICATION

(75) Inventors: Daniel Zoch, Walldorf (DE); Renzo Colle, Stutensee (DE); Henrik Saterdag, Bad Schonborn (DE)

(73) Assignee: SAP AG, Walldorf (DE)

( * ) Notice: Subject to any disclaimer, the term of this patent is extended or adjusted under 35 U.S.C. 154(b) by 1572 days.

(21) Appl. No.: 11/760,279

(22) Filed: Jun. 8, 2007

(65) Prior Publication Data

US 2008/0307395 A1   Dec. 11, 2008

(51) Int. Cl.
*G06F 9/44* (2006.01)
(52) U.S. Cl. ........................................................ 717/128
(58) Field of Classification Search .................. 717/126, 717/166, 168, 128; 709/224–226; 719/316, 719/332, 328; 707/9, 104.1; 705/7.25
See application file for complete search history.

(56) References Cited

U.S. PATENT DOCUMENTS

| | | |
|---|---|---|
| 5,761,509 A | 6/1998 | Danforth et al. |
| 6,083,281 A | 7/2000 | Diec et al. |
| 6,139,198 A | 10/2000 | Danforth et al. |
| 6,381,628 B1 | 4/2002 | Hunt |
| 6,983,463 B1 * | 1/2006 | Hunt ............................. 719/316 |
| 2005/0071816 A1 | 3/2005 | Levine et al. |
| 2005/0203952 A1 * | 9/2005 | Deily et al. ................. 707/104.1 |
| 2006/0129745 A1 | 6/2006 | Thiel et al. |
| 2006/0179058 A1 * | 8/2006 | Bram et al. ........................ 707/9 |
| 2007/0011332 A1 * | 1/2007 | Raghavan et al. ............. 709/226 |
| 2007/0038591 A1 | 2/2007 | Haub et al. |

OTHER PUBLICATIONS

'X-Trace Metadata Specification v1.1' [online]. Fonseca and Porter, 2006 [retrieved on Jun. 7, 2007]. Retrieved from the Internet: <URL: http://xtrace.cs.berkeley.edu/xtrace-id-spec-draft01.html>, 6 pages.

* cited by examiner

*Primary Examiner* — Tuan A Vu
(74) *Attorney, Agent, or Firm* — Fish & Richardson P.C.

(57) ABSTRACT

A computer-implemented method for providing registration of a communication includes locating a reference in metadata for an object-processing framework. The reference identifies a portion of logic that performs a specific service. The method includes storing at least part of the located reference in a trace object. The method includes replacing the located reference in the metadata with a reference to the trace object.

13 Claims, 4 Drawing Sheets

PROVIDING REGISTRATION OF A COMMUNICATION

TECHNICAL FIELD

This document relates to registering a communication in a system.

BACKGROUND

Computer systems are configured to include a collection of modules, components or other entities that take part in the operation of the system and that can affect its behavior in one or more ways. Such units can be considered the modules that make up the system and they are often implemented as software components. Software can be written in any of a number of programming languages and is generally used to cause a processor to execute specific instructions. However, after designing such a system it may be desirable to test or otherwise investigate one or more aspects thereof to verify whether it works, or will work, as intended.

One of the aspects that it is sometimes desirable to test is a communication between two or more components. This may be because errors or other unwanted behavior can arise in, show most apparently in, or proliferate most significantly in such portions of the system's operation. As another example, the presence or absence of a specific communication can indicate whether the system is operating as intended.

SUMMARY

The invention relates to registering a communication.

In a first aspect, a computer-implemented method for providing registration of a communication includes locating a reference in metadata for an object-processing framework. The reference identifies a portion of logic that performs a specific service. The method includes storing at least part of the located reference in a trace object. The method includes replacing the located reference in the metadata with a reference to the trace object.

Implementations can include any, all or none of the following features. The method can further include performing, using the trace object, a tracing of a communication between the object-processing framework and the portion of logic. The method can further include receiving, before performing the tracing, a request from a service consumer to provide the specific service, wherein the communication between the object-processing framework and the portion of logic is triggered by the request. The method can further include generating a call to the trace object using the reference to the trace object, the call requesting the specific service to be performed and being part of the communication between the object-processing framework and the portion of logic, wherein the tracing is performed in response to the call. The method can further include generating a call to the portion of logic using the reference stored in the trace object, the call to the portion of logic requesting the specific service to be performed and being part of the communication between the object-processing framework and the portion of logic. The tracing can include recording at least one aspect of the communication selected from: a number of calls made; an analysis of application behavior; identification of a runtime; and combinations thereof. The communication can include a call-back reference identifying an interface of the object-processing framework to be used for a response from the portion of logic, and the response can be traced using the call-back reference. The method can further include replacing, in information sent by the object-processing framework to the trace object, the call-back reference with the reference to the trace object; and forwarding to the portion of logic the information including the reference to the trace object. The method can further include subsequently replacing the reference to the trace object in the metadata with the reference to the portion of logic. The tracing can be performed in a loop to register communications regarding multiple requests for the specific service. The specific service can involve a call for another service, and the method can further include performing another tracing for the call to the other service. The object-processing framework and the portion of logic can include a plurality of interfaces for communicating, and the trace object can be configured to be used in performing tracing in communications between any of the interfaces.

In a second aspect, a computer program product is tangibly embodied in an information carrier and includes instructions that when executed by a processor perform a method for providing registration of a communication. The method includes locating a reference in metadata for an object-processing framework. The reference identifies a portion of logic that performs a specific service. The method includes storing at least part of the located reference in a trace object. The method includes replacing the located reference in the metadata with a reference to the trace object.

In a third aspect, a computer program product is tangibly embodied in an information carrier and includes instructions that when executed by a processor perform a method for providing registration of a communication. The method includes (i) performing a tracing setup procedure that includes: locating, in metadata that forms a configuration for an object-processing framework, a reference that identifies a portion of logic as performing a specific service; storing at least part of the located reference in a trace object that is configured to cause tracing upon receiving a call from the object-processing framework; and replacing the reference in the metadata with a reference to the trace object such that the trace object will be called when the specific service is requested. The method includes (ii) performing, after the tracing setup procedure, a tracing procedure that includes: receiving a request from a service consumer to provide the specific service; locating, in response to the request, the reference to the trace object in the configuration; generating a call to the trace object using the reference to the trace object, the call requesting the specific service to be performed; performing the tracing, including recording at least one aspect of the generated call to the trace object; and generating a call to the portion of logic requesting that the portion of logic perform the specific service, the call to the portion of logic generated using the reference stored in the trace object.

Implementations can include any, all or none of the following features. The communication can include a call-back reference identifying an interface of the object-processing framework to be used for a response from the portion of logic, and the response can be traced using the call-back reference. The method can further include replacing, in information sent by the object-processing framework to the trace object, the call-back reference with the reference to the trace object; and forwarding to the portion of logic the information including the reference to the trace object. The object-processing framework and the portion of logic can include a plurality of interfaces for communicating, and wherein the trace object is configured to be used in performing tracing in communications between any of the interfaces. The method can further include (iii) performing a tracing deactivation procedure that includes: subsequently replacing the reference to the trace object in the metadata with the reference to the portion of logic.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
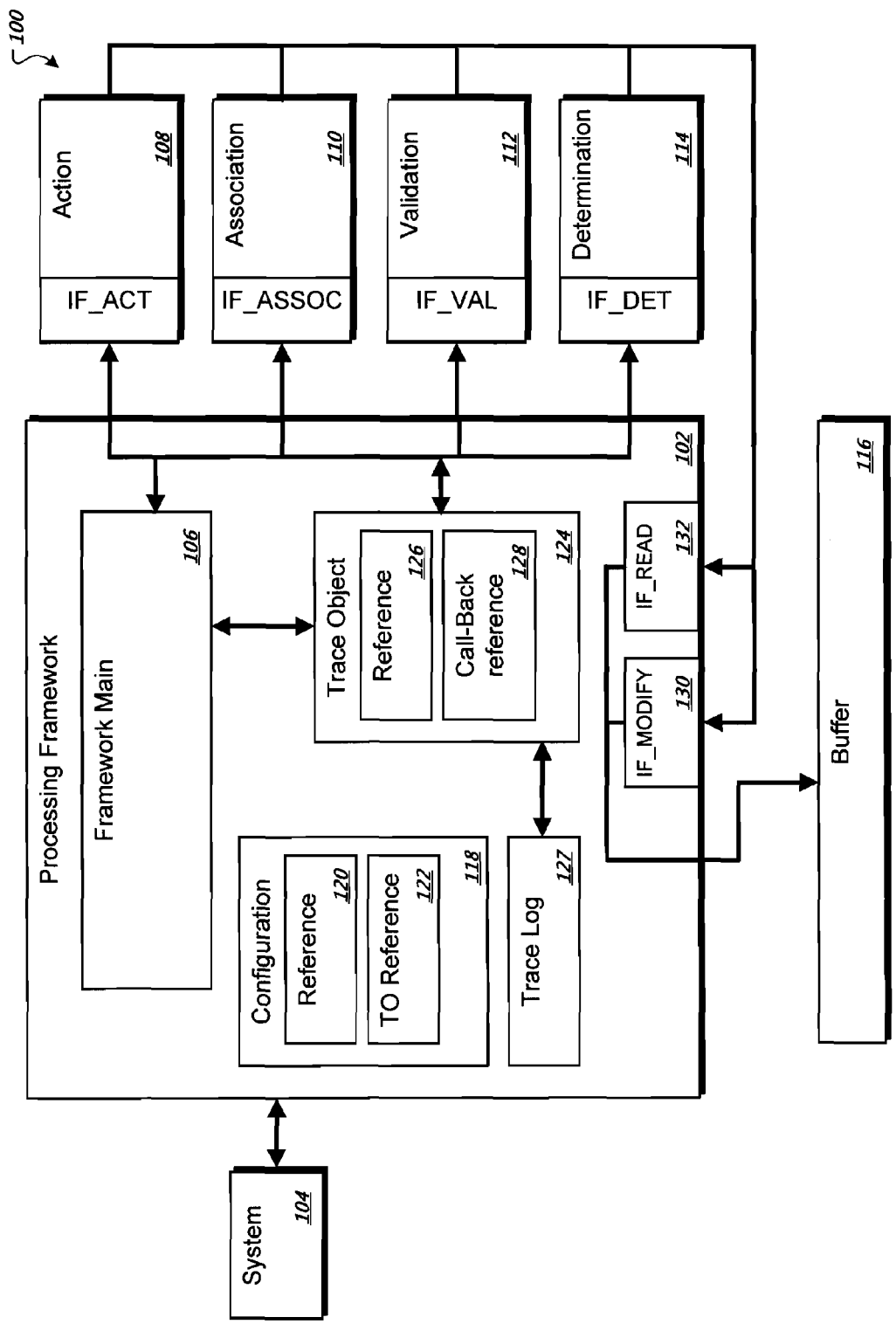
FIG. 1 is a block diagram of a system that can be used for tracing an object.

FIG. 1 is a system 100 which includes at least a processing framework 102, system 104, and one or more portions of logic 108-114. The processing framework 102 includes a framework main 106, a configuration 118, and a trace object 124. The processing framework is configured to provide communication between the system 104 and any or all of the logic 108-114, among other tasks. For example, the framework 102 can be configured for processing business-related objects and the system 104 can be configured to generate calls to, and receive calls originating from, such object in the performance of one or more business-related tasks. Such tasks can include the processing of an order, the handling of an invoice, and the management of a leave request, to name just a few examples. The configuration 118 allows virtual storing of metadata components that, for example, can identify any or all of the logic portions 108-114 as being responsible for providing a requested service. Below will be described examples how a communication regarding a service can be traced.

The following is an example of processing that can be performed in the system 100. The processing framework 102 receives requests, e.g. from a service consumer, to provide a specific service. The processing framework 102 identifies the portion(s) of logic 108-114 to perform the specific service and then calls the portion(s) to initiate the service. After the service is performed, the processing framework 102 can communicate back to the service consumer (e.g., to the main system).

The processing framework 102 in this implementation contains a framework main 106, the configuration 118, and the trace object 124. The framework main 106 is for example used in interacting with the service logic 108-114. The configuration 118, i.e. metadata, stores a reference 120 for the requested service. The framework can read the reference 120 to learn which one(s) of the logic 108-114 to call for a specific service. A single reference is shown in this example for clarity, and in other implementations there can be many references.

The following describes an example of how tracing can be performed. The trace object 124 can begin by identifying one of the logics 108-114 for which tracing is to be performed. This identification can be built-in into the trace object 124 (e.g., the object is programmed to trace communications regarding a specific service), or the identification can be made when tracing is to be initiated (e.g., by a suitable input to the trace object 124 at that time), to name just two examples.

Having identified the logic 108-114, the trace object 124 locates the reference 120 that corresponds to the identified logic. That is, the trace object 124 identifies the metadata in the configuration 118 that references the logic portion(s) 108-114 for a specific service. Moreover, the trace object 124 substitutes its own reference 126 for the located reference 120 in the configuration 118. That is, the trace object 124 can read the reference 120 from the metadata and store it in another location (such as within the trace object itself, here illustrated by reference 126), and also place a trace object reference (TO reference) 122 in the configuration 118. The TO reference 122 identifies the trace object 124 such that the trace object 124 can be called using the TO reference 122. In some implementations, the reference 120 is removed in this process, and in other implementations it can be deactivated, to name two examples.

In any event, the configuration 118 contains the TO reference 122 that has been stored. The trace object can store the reference 120 inside itself as a reference 126. Assume now that the system 104 triggers the processing framework 102 to have a specific service performed. The framework 102 (e.g., by the framework main 106) accesses the configuration 118 and identifies the TO reference 122 as the one associated with the sought service. In some implementations, it may not be detectable or noticeable to the framework that the TO reference 122 is different from the reference 120; in other words, the framework may not "know" that the reference points to the trace object 124 and not directly to one or more of the logic 108-114.

The framework main 106 therefore uses the TO reference 122 to call the trace object 124 when the service is to be performed. This means that at this point, it is the trace object 124 that receives the call from the framework that is intended for the logic(s) 108-114. The trace object 124 performs the tracing by recording at least one aspect of the communication in a trace log 127. The tracing can cover any aspect of the call, such as the number of calls made, an analysis of application behavior, identification or a runtime, a combination of these, or one or more other aspects.

As noted, the trace object 124 has stored the reference 126 to the portion of logic 108-114 for the specific service. The trace object 124 uses this reference to call the portion of logic 108-114 to perform the specific service. In some implementations, the trace object 124 can forward the call that was received from the framework 102, or generate a new call to the logic 108-114 based on information in the received call, to name two examples. In any event, the designated one or more of the logic 108-114 receives the call for a service and begins performing one or more operations accordingly.

In one embodiment, one of the portions of logic is called Action logic 108. The Action logic 108 can communicate with a database buffer 116 by using the processing framework 102 to read and modify the database, for example. In such an implementation, the Action logic 108 can use an IF_MODIFY interface 130 to modify data and/or can use an IF_READ interface 132 to read data from the buffer 116. In other words, the Action logic 108 can be responsible for providing a service that involves performing a specific action (e.g., on data in the buffer). As another example, the Association logic 110 can be used for identifying or creating an association between two or more items (such as objects or other entities). As another example, the Validation logic 112 can be used to perform a validation of data. As the last example to be mentioned here, the Determination logic 114 can be used to perform a determination (such as for determining a specific aspect of some data in the buffer). Other types of logic can be used.

After the logic 108-114 performs one or more operations, it may need to communicate information back to the framework 102. The framework 102 can provide an interface for this, for example an interface to the framework main 106. When the framework sends its communication to the logic 108-114 (e.g., when calling the logic), it can include therein a call-back reference as a way of identifying the interface(s) to the logic 108-114 for making the response. However, the initial recipient of such a communication can be the trace object 124 as described above.

To provide for tracing of the response from the logic 108-114, the trace object 124 may extract a call-back reference 128 from the communication upon receipt and store it. For example, the call-back reference 128 can be stored within the trace object 124. Instead, the trace object 124 can place another reference in the communication before forwarding it to the logic 108-114, such as a reference to the trace object 124 itself. That is, when the logic 108-114 receives the communication (e.g., the call) from the trace object 124, the reference for responding to that communication can point back to the trace object 124.

Accordingly, the trace object 124 may receive a response from the logic 108-114 after a service has been performed. The trace object 124 can perform a tracing on one or more aspects of this communication, for example any of the traced aspects mentioned above, and store this as a record in the trace log 127. Moreover, the trace object 124 can use the call-back reference 128 to identify an interface of the processing framework 102 to which the response should be forwarded. The trace object 124 can forward the response received from the logic to the correct interface of the framework 102.

For example, the Action logic 108 may be configured to send a response after it has finished updating a portion of data. The Action logic 108 in this example has been directed to forward its response to the trace object 124. The Action logic 108 sends its response that it has completed updating a portion of the data, this response can be traced by the trace object 124, and the response can be forwarded to the processing framework 102.

The trace object 124 can be implemented using executable code in any programming language. For example, such code can be designed to perform the extraction of the reference 120 from the configuration 118 and the placement of the TO reference 122 therein; the tracing of the communication received from the processing framework 102; the forwarding of the communication to the logic 108-114 and the tracing of the response received therefrom; and the forwarding of the received response to the processing framework 102 using the call-back reference 128. Other functions can be provided.

Figure 2:
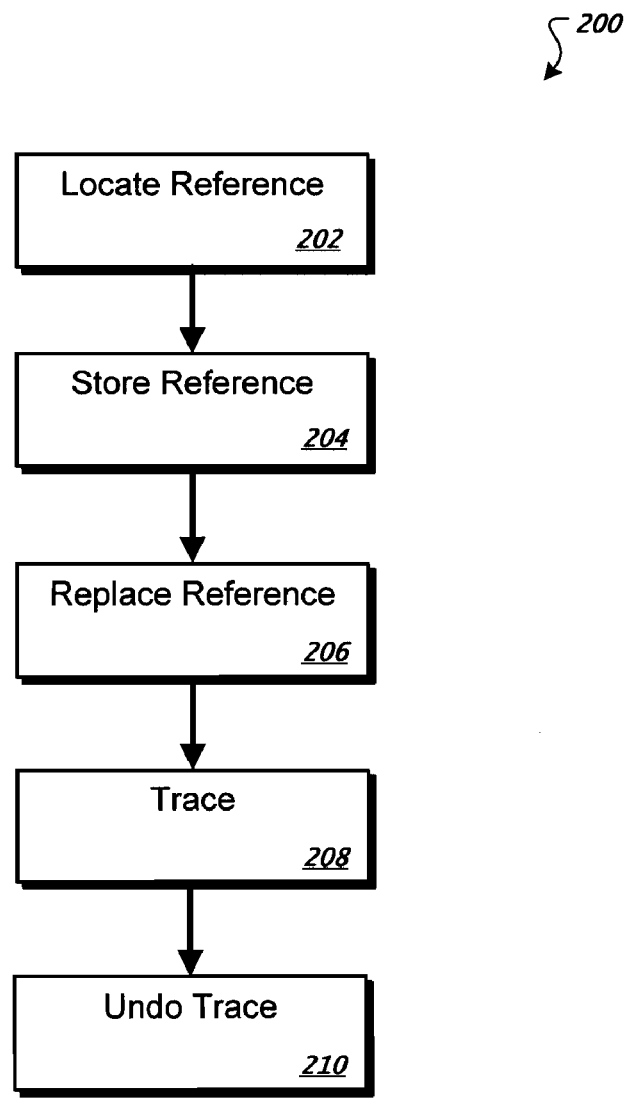
FIG. 2 is a flow chart with an example of a process for providing registration of a communication.
Figure 3:
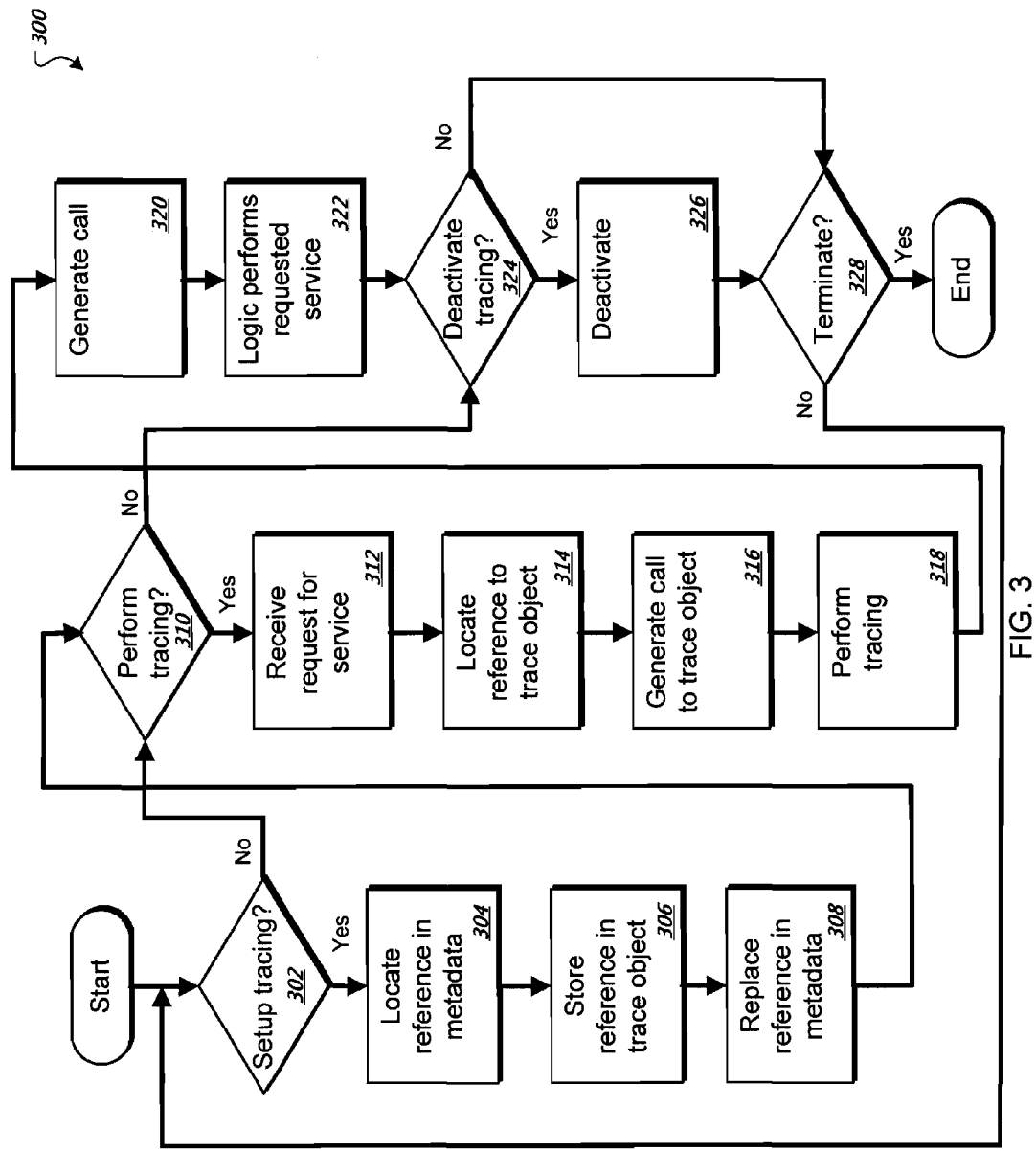
FIG. 3 is a flow chart with an example of a process for performing a tracing.

FIGS. 2 and 3 are flow charts showing examples of processes 200 and 300, respectively. Either or both of the processes 200 and 300 may be performed, for example, by a processor reading executable instructions in a system such as the system 100. For clarity of presentation, the description that follows uses the system 100 as the basis of an example for describing the processes 200 and 300. However, another system, or combination of systems, may be used to perform any of the processes 200 and 300.

Referring to FIG. 2, the flow chart shows an example of the process 200 for providing registration of a communication, such as by performing a tracing. The process 200 begins in step 202 by locating a reference in metadata for an object-processing framework. The reference identifies a portion of logic that performs a specific service. For example, the trace object 124 can locate the reference 120 in the configuration 118 (FIG. 1), wherein the reference 120 identifies the logic 114 as providing the service of performing a determination.

The process 200 can continue in step 204 by storing at least part of the located reference in a trace object. For example, the processing framework 102 can store reference 120 from the configuration 118 in a reference 126 within the trace object 124.

The process 200 can continue in step 206 by replacing the located reference in the metadata with a reference to the trace object. For example, the reference 120 within the configuration 118 (i.e. metadata) is replaced with the TO reference 122 to the trace object 124 instead of the reference to the logic.

In step 208 the tracing can be performed. For example, the logic 112 for validation is requested to perform a service. The trace object 124 sends the request it receives from the framework 102 to the logic 112 and can trace any aspect of the call, such as the number of calls made, an analysis of application behavior, identification or a runtime, or a combination of these three, or one or more other aspects. Moreover, the tracing can include a response communication from the called logic to the framework. The tracing can be registered in the trace log 127.

In step 210 the tracing can be undone. For example, the reference 120 within the configuration 118 is replaced with a reference to the logic 108-114 instead of to the trace object 124. This can be initiated by the trace object 124 at a specific time or after a predetermined number of trace events, to name two examples.

Referring to FIG. 3, the flow chart shows an example of the process 300 for performing a tracing. The process 300 begins in step 302 by determining if a tracing procedure is to be setup. For example, if tracing is desired and the trace object 124 (FIG. 1) has not been configured to trace the communication between the processing frame work 102 and the logic 108-114 it can be determined in step 302 that tracing should be setup. In contrast, if tracing has already been set up then the determination in step 302 can result in the negative.

If tracing is to be set up in step 302, the process 300 can continue with step 304 by locating, in metadata that forms a configuration for an object-processing framework, a reference that identifies a portion of logic as performing a specific service. For example, the processing framework 102 can locate the reference 120 in the configuration 118 (FIG. 1), and the reference 120 can identify the logic 112 as providing the service of performing a validation. Process 300 can continue with step 306 by storing at least part of the located reference in a trace object that is configured to cause tracing upon receiving a call from the object-processing framework. For example, the processing framework 102 can store reference 120 from the configuration 118 in a reference 126 within the trace object 124. The process 300 can continue with step 308 by replacing the reference in the metadata with a reference to the trace object such that the trace object will be called when the specific service is requested. For example, the reference 120 within the configuration 118 (i.e. metadata) is replaced with a reference to the trace object 124 instead of a reference to the logic.

The process 300 can continue with step 310 determining if tracing should be performed. This step can be performed after step 308 or as another example directly after step 302. The determination in step 310 in some implementations can be built-in into the trace object 124 (e.g., the object is programmed to trace communications regarding a specific service), or the identification can be made when tracing is to be initiated (e.g., by a suitable input to the trace object at that time). If it is determined in step 310 that tracing is to be performed, the process 300 can continue with step 312 in which a request from a service consumer to provide the specific service is received. For example, system 104 (FIG. 1) receives a request from a user to validate a portion of data. The system 104 passes this request to the processing framework 102.

The process 300 can continue with step 314 by locating, in response to the request, the reference to the trace object in the configuration. For example, the processing framework 102 locates the TO reference 122 in the configuration 118. The process 300 can continue with step 316 by generating a call to the trace object using the reference to the trace object, the call requesting the specific service to be performed. For example, the processing framework 102 generates a call to the trace object 124 using the TO reference 122. The process 300 can continue with step 318 by performing the tracing, including recording at least one aspect of the generated call to the trace object. For example, the tracing can trace any aspect of the call, such as the number of calls made, an analysis of application behavior, identification or a runtime, or a combination of these three, or one or more other aspects. The process 300 can continue with step 320 by generating a call to the portion of logic requesting that the portion of logic perform the specific service, the call to the portion of logic generated using the reference stored in the trace object. For example, the trace object 124 uses the reference 126 to call the specific requested portion of logic 108-114. In step 322 the logic performs the requested service. For example, the validation portion 112 of logic can be run to validate a portion of data. In step 324 a decision is made whether to deactivate tracing. If tracing is to be deactivated the process 300 continues with step 326. For example, if tracing is no longer desired, the configuration 118 TO reference 122 can be replaced with a reference to the correct one(s) of the portions of logic 108-114. In step 328 a decision is made whether to terminate the process. A trace may be run once on the Action logic 108 and then deactivated, or a trace may be performed over a period of time, to name just two examples.

In short, if at step 302 tracing is already setup, the step 310 can be processed next to decide if tracing is to be performed. If tracing is not to be performed, the step 324 can be processed next to decide whether or not to deactivate tracing. If tracing is not to be deactivated, the next step 328 can be to decide whether or not to terminate. If the process does not terminate the process can return to the first step 302 and decide if tracing is needed.

In another example, a loop can be processed between step 310 and step 322. The trace can first be set up in steps 302-308. The trace then can continuously loop over steps 310-322 one or more times to record each call the consumer performs. For example, this can be done by not deactivating tracing at step 324 but rather returning to step 210. The trace can continue tracing the communication as long as the tracing is active. Furthermore, in some implementations the requested service of step 322 may also request another service of the same object. In this case, the process 300 can be nested for the calling of a service. For example, the steps 312-322 can be performed (for the other requested service) as part of performing step 322 for the original requested service.

Figure 4:
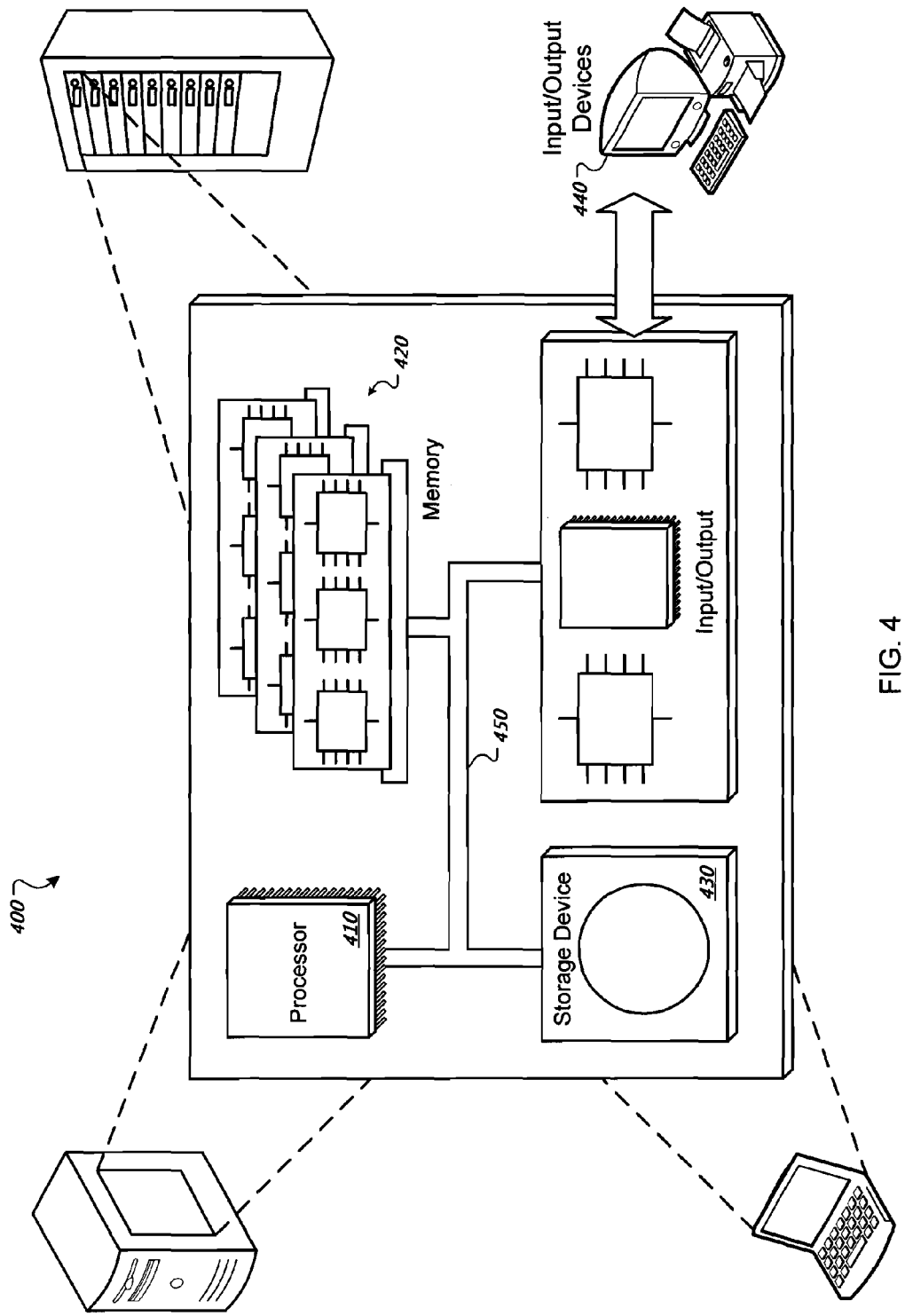
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 1100. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method, comprising:
storing, by an object-processing framework that provides for communication between a computing system and multiple portions of logic that each provide a service, configuration metadata that includes multiple references that each identify at least one of the multiple portions of logic, wherein the object-processing framework:
 (a) is configured to receive, from the computing system, a request to provide a particular service, and in response to the request, send a call to perform the particular service to a particular one of the multiple portions of logic that provides the particular service; and
 (b) includes a trace object that is configured to trace information associated with the request to provide the particular service;
identifying, by the object-processing framework, the particular portion of logic;
locating, by the object-processing framework and in the configuration metadata, a particular one of the multiple references that identifies the particular portion of logic;
storing, by the object-processing framework, at least part of the particular reference in the trace object;
replacing, by the object-processing framework, the particular reference in the configuration metadata with a reference to the trace object such that the object-processing framework is thereafter arranged to send a call to the trace object upon receiving the request to provide the particular service;
receiving, by the object-processing framework, the call to the trace object, wherein the call to the trace object includes a call-back reference identifying an interface of the object-processing framework to which a response from the particular portion of logic is to be forwarded;
replacing, by the object-processing framework and in the call to the trace object, the call-back reference with the reference to the trace object, and storing the call-back reference;
forwarding, by the object-processing framework and to the particular portion of logic, the call to the trace object as a call to the particular portion of logic;
tracing, using the trace object, the call from the object-processing framework to the particular portion of logic;
receiving, using the trace object, the response from the particular portion of logic;
identifying, by the object-processing framework and using the stored call-back reference, the interface of the object-processing framework to which the response is to be forwarded; and
forwarding, using the trace object, the response to the interface of the object-processing framework.

2. The computer-implemented method of claim 1, further comprising receiving, by the object-processing framework and before performing the tracing, the request from the computing system to provide the particular service, wherein the call from the object-processing framework to the portion of logic is triggered by the request.

3. The computer-implemented method of claim 1, further comprising using, by the object-processing framework, the reference to the trace object to generate the call to the trace object, the call to the trace object requesting that the particular service be performed, wherein the tracing is performed in response to the call to the trace object.

4. The computer-implemented method of claim 3, further comprising using, by the trace object of the object processing framework, the particular reference that is stored in the trace object to generate the call to the particular portion of logic, the call to the particular portion of logic requesting that the particular service be performed.

5. The computer-implemented method of claim 1, wherein the tracing comprises recording at least one aspect of the call from the object-processing framework to the particular portion of logic selected from: a number of calls made; an analysis of application behavior; identification of a runtime; and combinations thereof.

6. The computer-implemented method of claim 1, further comprising subsequently replacing, in the configuration metadata, the reference to the trace object with the reference to the particular portion of logic.

7. The computer-implemented method of claim 1, wherein the tracing is performed in a loop to register calls regarding multiple requests for the particular service.

8. The computer-implemented method of claim 1, wherein the particular service involves a call for another service, further comprising performing another tracing for the call to the other service.

9. The computer-implemented method of claim 1, wherein the object-processing framework and the particular portion of logic include a plurality of interfaces for communicating, and wherein the trace object is configured to be used in performing tracing in communications between any of the interfaces.

10. A computer program product tangibly embodied in a machine-readable storage device and comprising instructions that when executed by a processor perform a method, the method comprising:
storing, by an object-processing framework that provides for communication between a computing system and multiple portions of logic that each provide a service, configuration metadata that includes multiple references that each identify at least one of the multiple portions of logic, wherein the object-processing framework:

(a) is configured to receive, from the computing system, a request to provide a particular service, and in response to the request, send a call to perform the particular service to a particular one of the multiple portions of logic that provides the particular service, and (b) includes a trace object that is configured to trace information associated with the request to provide the particular service;

identifying, by the object-processing framework, the particular portion of logic;

locating, by the object-processing framework and in the configuration metadata, a particular one of the multiple references that identifies the particular portion of logic;

storing, by the object-processing framework, at least part of the particular reference in the trace object;

replacing, by the object-processing framework, the particular reference in the configuration metadata with a reference to the trace object such that the object-processing framework is thereafter arranged to send a call to the trace object upon receiving the request to provide the particular service;

receiving, by the object-processing framework, the call to the trace object, wherein the call to the trace object includes a call-back reference identifying an interface of the object-processing framework to which a response from the particular portion of logic is to be forwarded:

replacing, by the object-processing framework and in the call to the trace object, the call-back reference with the reference to the trace object, and storing the call-back reference;

forwarding, by the object-processing framework and to the particular portion of logic, the call to the trace object as a call to the particular portion of logic;

tracing, using the trace object, the call from the object-processing framework to the particular portion of logic;

receiving, using the trace object, the response from the particular portion of logic;

identifying, by the object-processing framework and using the stored call-back reference, the interface of the object-processing framework to which the response is to be forwarded; and forwarding, using the trace object, the response to the interface of the object-processing framework.

11. A computer program product tangibly embodied in a machine-readable storage device and comprising instructions that when executed by a processor perform a method, the method comprising:

(i) storing, by an object-processing framework that provides for communication between a computing system and multiple portions of logic that each provide a service, configuration metadata that includes multiple references that each identify at least one of the multiple portions of logic, wherein the object-processing framework:

(a) is configured to receive, from the computing system, a request to provide a particular service, and in response to the request, send a call to perform the particular service to a particular one of the multiple portions of logic that provides the particular service, and (b) includes a trace object that is configured to trace information associated with the request to provide the particular service;

(ii) performing a tracing setup procedure that includes:
identifying, by the object-processing framework, the particular portion of logic;

locating, by the object-processing framework and in the configuration metadata, a particular one of the multiple references that identifies the particular portion of logic;

storing, by the object-processing framework, at least part of the particular reference in the trace object; and replacing, by the object-processing framework, the particular reference in the configuration metadata with a reference to the trace object such that the object-processing framework is thereafter arranged to call the trace object upon receiving the request to provide the particular service; and (iii) performing, after the tracing setup procedure, a tracing procedure that includes:
receiving, by the object-processing framework, the request from the computing system to provide the particular service;

locating, by the object-processing framework and in response to receiving the request, the reference to the trace object in the configuration metadata;

using, by the object-processing framework and in response to locating the reference to the trace object, the reference to the trace object to generate a call to the trace object, the call requesting that the specific service be performed, wherein the call to the trace object includes a call-back reference identifying an interface of the object-processing framework to which a response from the particular portion of logic is to be forwarded;

replacing, by the object-processing framework and in the call to the trace object, the call-back reference with the reference to the trace object, and storing the call-back reference;

recording, by the trace object of the object-processing framework and in response to generating the call to the trace object, at least one aspect of the call to the trace object;

using, by the trace object of the object processing framework, the reference stored in the trace object to generate a call to the particular portion of logic;

forwarding, by the trace object of the object-processing framework and in the call to the particular portion of logic, the reference to the trace object;

receiving, using the trace object, the response from the particular portion of logic;

identifying, using the stored call-back reference, the interface of the object-processing framework to which the response is to be forwarded; and forwarding, using the trace object, the response to the interface of the object-processing framework.

12. The computer program product of claim 11, wherein the object-processing framework and the particular portion of logic include a plurality of interfaces for communicating, and wherein the trace object is configured to be used in performing tracing in communications between any of the interfaces.

13. The computer program product of claim 11, wherein the method further comprises:

(iii) performing, by the object processing framework, a tracing deactivation procedure that includes:
subsequently replacing, by the object processing framework, the reference to the trace object in the configuration metadata with the reference to the portion of logic.

* * * * *